United States Patent
Li

(10) Patent No.: US 9,634,842 B2
(45) Date of Patent: Apr. 25, 2017

(54) METHOD FOR TRANSMITTING SIGNED DATA AND ELECTRONIC SIGNATURE TOKEN

(71) Applicant: Tendyron Corporation, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 14/901,966

(22) PCT Filed: Apr. 25, 2014

(86) PCT No.: PCT/CN2014/076269
§ 371 (c)(1),
(2) Date: Dec. 29, 2015

(87) PCT Pub. No.: WO2015/000332
PCT Pub. Date: Jan. 8, 2015

(65) Prior Publication Data
US 2016/0365980 A1    Dec. 15, 2016

(30) Foreign Application Priority Data
Jul. 1, 2013   (CN) .......................... 2013 1 0272578

(51) Int. Cl.
*H04L 9/32*     (2006.01)
*G06F 21/64*    (2013.01)
(Continued)

(52) U.S. Cl.
CPC ............ *H04L 9/3247* (2013.01); *G06F 21/64* (2013.01); *H04L 9/14* (2013.01); *H04L 9/3234* (2013.01); *H04L 63/06* (2013.01)

(58) Field of Classification Search
USPC ....................................................... 713/176
See application file for complete search history.

(56) References Cited

U.S. PATENT DOCUMENTS

2003/0195858 A1* 10/2003 Watanabe .......... G06Q 20/0855
                                                         705/75
2005/0091661 A1*  4/2005 Kurien ................... G06F 21/53
                                                         719/310
(Continued)

FOREIGN PATENT DOCUMENTS

CN      102063589 A     5/2011
CN      102664893 A     9/2012
(Continued)

OTHER PUBLICATIONS

Chinese International Search Report corresponding to PCT application No. PCT/CN2014/076269 (12 pages).

*Primary Examiner* — William Goodchild
(74) *Attorney, Agent, or Firm* — Maginot, Moore & Beck, LLP

(57) ABSTRACT

Provided is a method for transmitting signed data and an electronic signature token, the method comprising: an electronic signature token obtaining a signing request data packet comprising data to be signed; signing the data to be signed to obtain signed data; obtaining a preset first transmitting strategy, and obtaining first data to be transmitted according to a part of the signed data and the first transmitting strategy, and transmitting the first data to be transmitted; after obtaining the signing request data packet, extracting and outputting the key information of the data to be signed; obtaining a confirmation instruction for the outputted critical information of the data to be signed; after obtaining the confirmation instruction, obtaining a preset second transmission strategy, and obtaining second data to be transmitted, according to a remaining part of the signed data and the second transmission strategy, and transmitting the second data to be transmitted.

20 Claims, 2 Drawing Sheets

(51) Int. Cl.
*H04L 9/14* (2006.01)
*H04L 29/06* (2006.01)

(56) References Cited

U.S. PATENT DOCUMENTS

| | | | | |
|---|---|---|---|---|
| 2005/0246204 A1* | 11/2005 | Simon | ............... | G06F 19/322 |
| | | | | 705/3 |
| 2009/0044248 A1* | 2/2009 | Nakamura | ............ | G06F 21/604 |
| | | | | 726/1 |
| 2009/0063354 A1* | 3/2009 | Sheets | ............... | G06Q 20/04 |
| | | | | 705/75 |

FOREIGN PATENT DOCUMENTS

| CN | 103346886 A | 10/2013 |
|---|---|---|
| WO | WO2006042392 A1 | 4/2006 |
| WO | WO2015000332 A1 | 1/2015 |

* cited by examiner

US 9,634,842 B2

METHOD FOR TRANSMITTING SIGNED DATA AND ELECTRONIC SIGNATURE TOKEN

CROSS REFERENCE TO RELATED APPLICATION

This application claims priority under 35 U.S.C 371 to, and is a U.S. National Stage application of, International Patent Application No. PCT/CN2014/076269, filed Apr. 25, 2014, which claims the benefit of prior Chinese Application No. 201310272578.8 filed Jul. 1, 2013. The entire contents of the above-mentioned patent applications are incorporated herein by reference as part of the disclosure of this application.

FIELD

The present disclosure relates to an electronic technology field, and more particularly to a method for transmitting signed data and an electronic signature token.

BACKGROUND

The electronic signature token is an important tool for protecting the fund security of e-bank. The electronic signature token, which is a tool for electronic signature and digital authentication of e-bank, has an internal micro smart card processor, and performs encryption, decryption and digital signing to the online data by using the secret key algorithm, thus ensuring secrecy, truth, completeness and non-repudiation of the online transaction.

In the related art, after receiving the transaction information transmitted from outside, the electronic signature token signs the transaction information and transmitted the signed data to the external device, so as to ensure truth and non-repudiation of the user identity.

In practice, the required time of the transmitting flow of above signed data is relatively long. How to reduce the transmitting time of the signed data is a problem requiring immediate solution.

SUMMARY

To solve at least one of the problems above, the present disclosure provides a method for transmitting signed data and an electronic signature token.

In order to achieve above aims, the specific technical solution of the present disclosure is realized in following manner.

A method for transmitting signed data is provided, including: obtaining a signing request data packet by an electronic signature token, wherein the signing request data packet comprises data to be signed; signing the data to be signed by the electronic signature token to obtain signed data; obtaining a preset first transmitting strategy, obtaining first data to be transmitted according to a part of the signed data and the first transmitting strategy, and transmitting the first data to be transmitted by one time or dividing the first data to be transmitted into multiple segments of first data and transmitting the multiple segments of first data by multiple times, by the electronic signature token; after obtaining the signing request data packet, extracting critical information of the data to be signed, and outputting the critical information of the data to be signed, by the electronic signature token; obtaining a confirmation instruction for the outputted critical information of the data to be signed by the electronic signature token; after obtaining the confirmation instruction, obtaining a preset second transmitting strategy, obtaining second data to be transmitted according to a remaining part of the signed data and the second transmitting strategy, and transmitting the second data to be transmitted by one time or dividing the second data to be transmitted into multiple segments of second data and transmitting the multiple segments of second data by multiple times, by the electronic signature token.

The first transmitting strategy is to encrypt and transmit the part of the signed data, and obtaining first data to be transmitted according to the part of the signed data and the first transmitting strategy comprises: obtaining an encrypting strategy corresponding to the part of the signed data; encrypting at least the part of the signed data by using the encrypting strategy to obtain a first encrypted result, and making the first encrypted result as the first data to be transmitted.

After obtaining the confirmation instruction by the electronic signature token, the method further includes: transmitting the encrypting strategy.

The encrypting strategy is transmitted when the second data to be transmitted is being transmitted.

A data size of the part of the signed data is greater than or equal to that of the remaining part of the signed data.

The data size of the remaining part of the signed data is 48 bytes.

An electronic signature token is provided, including: a first obtaining module, configured to obtain a signing request data packet comprising data to be signed; a signing module, connected with the first obtaining module, and configured to sign the data to be signed to obtain signed data; a second obtaining module, configured to obtain a preset first transmitting strategy; a first generating module, connected with the signing module and the second obtaining module, and configured to obtain first data to be transmitted according to a part of the signed data and the first transmitting strategy; a first transmitting module, connected with the first generating module, and configured to transmit the first data to be transmitted by one time or to divide the first data to be transmitted into multiple segments of first data and to transmit the multiple segments of first data by multiple times; an outputting module, connected with the first obtaining module, and configured to extract critical information of the data to be signed, and to output the critical information of the data to be signed, after obtaining the signing request data packet; a fourth obtaining module, connected with the outputting module, and configured to obtain a confirmation instruction for the outputted critical information of the data to be signed; a fifth obtaining module, configured to obtain a second transmitting strategy preset after obtaining the confirmation instruction; a second generating module, connected with the fifth obtaining module, and configured to obtain second data to be transmitted according to a remaining part of the signed data and the second transmitting strategy; a second transmitting module, connected with the second generating module, and configured to transmit the second data to be transmitted by one time or to divide the second data to be transmitted into multiple segments of second data and to transmit the multiple segments of second data by multiple times.

The first transmitting strategy is to encrypt and transmit the part of the signed data, and the first obtaining module includes: an obtaining unit, configured to obtain an encrypting strategy corresponding to the part of the signed data; an encrypting unit, configured to encrypt at least the part of the signed data by using the encrypting strategy to obtain a first encrypted result, and to make the first encrypted result as the first data to be transmitted.

The electronic signature token further includes: a third transmitting module, configured to transmit the encrypting strategy after obtaining the confirmation instruction for the critical information of the data to be signed.

The encrypting strategy is transmitted by the third transmitting module when the second data to be transmitted is being transmitted by the second transmitting module.

A data size of the part of the signed data is greater than or equal to that of the remaining part of the signed data.

The data size of the remaining part of the signed data is 48 bytes.

It can be seen from the technical solution provided by the present disclosure, compared with a fact in related art that the signed data is transmitted after displaying information is confirmed by a user, in the embodiments of the present disclosure, by transmitting the signed data at two time points (i.e., before the displaying information is confirmed by the user and after the displaying information is confirmed by the user), the data size transmitted after the displaying information is confirmed by the user is significantly decreased, thus reducing a transmitting time of the data.

In addition, because before the displaying information is confirmed by the user, a transmission line between the electronic signature token and an external device is idle, in embodiments of the present disclosure, the idle state is used to transmit a part of the signed data so as to increase a utilization rate of the transmission line.

BRIEF DESCRIPTION OF THE DRAWINGS

In order to make technical solutions according to embodiments of the present disclosure more apparent, drawings used in descriptions of the embodiments will be illustrated in the following. Obviously, the drawings to be illustrated in the following only represent some embodiments of the present disclosure, and other drawings can be obtained according to these drawings by those having ordinary skills in the related art without making creative labors.

DETAILED DESCRIPTION

Figure 1:
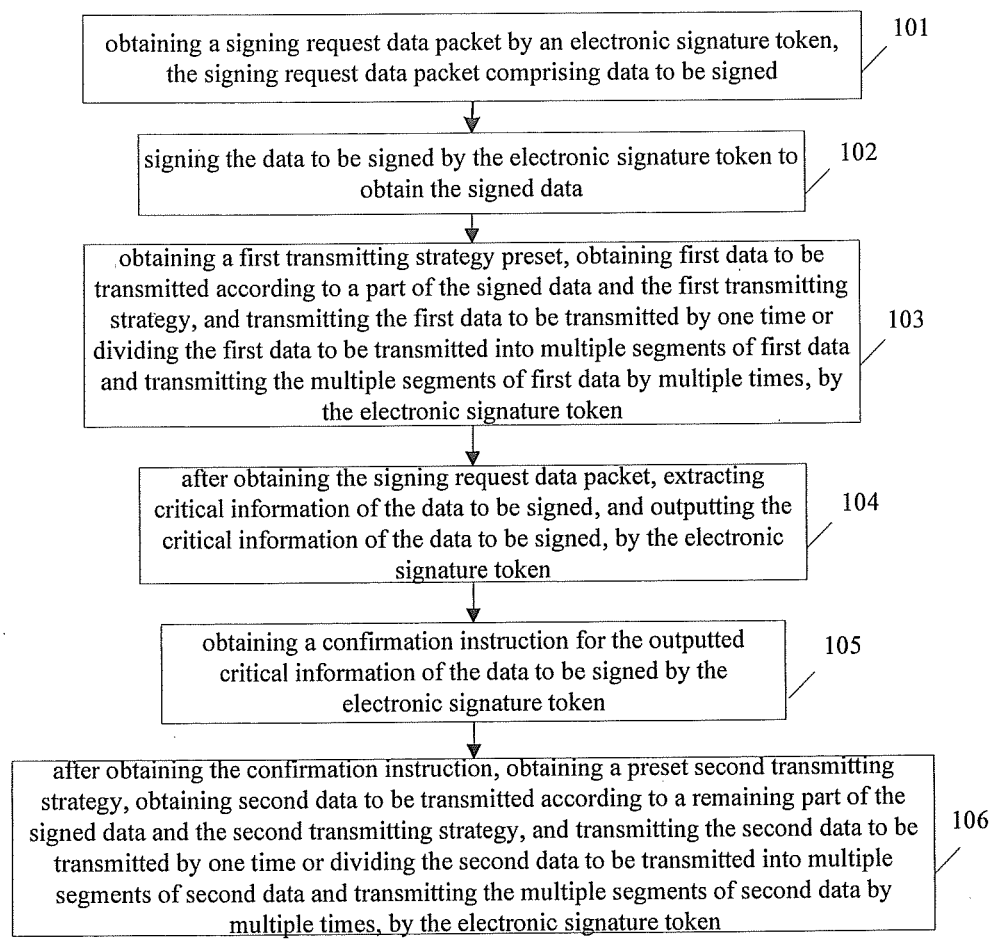
FIG. 1 is a flow chart of a method for transmitting signed data provided by embodiment 1 of the present disclosure.

The technical solution according to embodiments of the present disclosure will be described in the following with reference to drawings of the embodiments of the present disclosure. Obviously, the embodiments to be described only are some embodiments of the present disclosure, rather than all embodiments. Based on these embodiments of the present disclosure, other embodiments obtained by those having ordinary skills in the related art without making creative labors all fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

Embodiments of the present disclosure will be described in the following with reference to the drawings.

FIG. 1 is a flow chart of a method for transmitting signed data provided by an embodiment of the present disclosure. The method shown in FIG. 1 includes following steps.

In step 101, a signing request data packet is obtained by an electronic signature token. The signing request data packet includes data to be signed.

The electronic signature token may obtain the signing request data packet from an external device via a USB data cable or an audio transmission data cable. The data to be signed may be transaction information, such as amount of money, account information, time information and the like.

In step 102, the electronic signature token signs the data to be signed to obtain signed data.

In step 103, the electronic signature token obtains a first transmitting strategy preset, obtains first data to be transmitted according to a part of the signed data and the first transmitting strategy, and transmits the first data to be transmitted by one time, or divides the first data to be transmitted into multiple segments of first data and transmits the multiple segments of first data by multiple times.

The first transmitting strategy may be a setting strategy for the transmitted object, for example, direct transmitting or transmitting after encryption, or may be a setting strategy for transmitting the data by dividing the data into several segments and transmitting the segments of data by multiple times.

It will be illustrated below.

The first transmitting strategy is to encrypt and transmit the part of the signed data.

Obtaining the first data to be transmitted according to the part of the signed data and the first transmitting strategy, includes: obtaining an encrypting strategy corresponding to the part of the signed data; encrypting at least the part of the signed data by using the encrypting strategy to obtain a first encrypted result, and making the first encrypted result as the first data to be transmitted.

Compared with transmitting the part of the signed data directly, a part of the signed data with an encryption treatment is transmitted, which increases a length of the part of original signed data, thus improving an information security.

An encrypting strategy corresponding to the part of the signed data may be a single pre-stored encrypting strategy, and also may be one encrypting strategy selected from a plurality of encrypting strategies. Compared with the former, the later is more flexible in the selection of the encrypting strategy, thus increasing a randomicity of the encrypting strategy and reducing a possibility of decoding information.

In practice, one encrypting strategy may be selected from the plurality of encrypting strategies by following manners.

Manner 1: determining an encryption strategy corresponding to current time information according to the encrypting strategies pre-stored corresponding to different time regions, and making the encrypting strategy corresponding to current time information as the encrypting strategy corresponding to the part of the signed data;

Manner 2: selecting one encrypting strategy from the plurality of encrypting strategies randomly.

An encryption algorithm used in the encrypting strategies may be a symmetry encryption algorithm, also may be an asymmetry encryption algorithm, and also may be an encryption for data using random number.

In step 104, after obtaining the signing request data packet, the electronic signature token extracts critical information of the data to be signed, and outputs the critical information of the data to be signed.

The critical information may be account and/or name information in the transaction information.

An outputting manner may be a screen-display or a sound-play.

In practice, the electronic signature token may display partial or all information of the data to be signed according to a display space of the electronic signature token. Sure, the electronic signature token determines important fields to be displayed in the data to be signed according to a display instruction acquired.

It should be noted that, there is no fixed sequence for the display operation in step 104 and the step 103, that is, the two steps may be performed simultaneously or in turn.

In step 105, the electronic signature token obtains a confirmation instruction for the outputted critical information of the data to be signed.

The electronic signature token may determine whether the confirmation instruction is received by detecting keys on the electronic signature token, or, may receive the confirmation instruction via an information transmission interface, which is an audio transmission interface or a USB interface.

In step 106, after obtaining the confirmation instruction, the electronic signature token obtains a preset second transmitting strategy, obtains second data to be transmitted according to a remaining part of the signed data and the second transmitting strategy, and transmits the second data to be transmitted by one time, or divides the second data to be transmitted into multiple segments of second data and transmits the multiple segments of second data by multiple times.

Specifically, an encrypting strategy corresponding to the remaining part of the signed data is obtained, at least the remaining part of the signed data is encrypted by the encrypting strategy corresponding to the remaining part of the signed data to obtain a second encrypted result, and the second encrypted result is transmitted.

The transmitting manner of the remaining part of the signed data is similar with that of the part of the signed data in step 103, which will not be illustrated in detail herein. The encrypting strategy for the remaining part of the signed data may be or not be the same as the encrypting strategy for the part of the signed data. By using different encrypting strategies, it is facilitate for a reduction of the possibility of decoding the signed data by criminals.

It should be noted that, the encrypting strategies used by the step 103 and the step 106 may be negotiated with the external device in advance. However, for an increase of the random of the encrypting strategies, a reduction of the possibility of decoding a ciphertext of the signed data, and an assurance of the security of the signed data, preferably, the encrypting strategies for encrypting the signed data is transmitted by the electronic signature token.

A transmitting time for the encrypting strategies may be determined according to specific cases.

Specifically, the encrypting strategy of the part of the signed data is taken as example. The encrypting strategy may be transmitted before a confirmation of the user. For example, the encrypting strategy may be transmitted together with the first data to be transmitted or may be transmitted after a transmission of the first data to be transmitted. However, it is taken into account that, if the encrypting strategy is transmitted before displaying information is confirmed by the user, the criminals may use the encrypting strategy and a part of encrypted signed data received to perform a decoding so as to obtain a plaintext of a part of the signed data, such that it is possible for the criminals to backward infer a secret key for generating the signed data according to the plaintext of the part of the signed data, thus causing a release of the secret key of the electronic signature token and seriously destroying the security of the electronic signature token. Therefore, in order to prevent the release of the secret key of the electronic signature token, the encrypting strategy may be transmitted after the user has confirmed. Sure, for a transmission convenience, the encrypting strategy may also be transmitted together with the second data to be transmitted.

In terms of a transmitting time for the encrypting strategy of the remaining part of the signed data, since the confirmation for the displaying information has been obtained, the transmitting time for the encrypting strategy of the remaining part of the signed data may be at any time after obtaining the confirmation instruction, for example, it may be transmitted together with or separated from the remaining part of the signed data.

In addition, in order to further improve the transmitting time of the signed data, a data size of the part of the signed data is greater than or equal to that of the remaining part of the signed data. Specifically, a major part of the signed data is transmitted before the displaying information is confirmed by the user, and a minor part of the signed data is transmitted after the displaying information is confirmed by the user, thus reducing a transmitting pressure and shortening the transmitting time.

Sure, in practice, in order to prevent the criminals from obtaining the remaining part of the signed data by exhaustivity after obtaining the minor part of the signed data, and to ensure a data transmission speed, preferably, the data size of the remaining part of the signed data is 48 bytes.

In practice, a duration for transmitting certain signed data is about more than 1 second in related art. However, with the method provided by the present disclosure, the time spent for transmitting the same signed data ranges from 100 milliseconds to 200 milliseconds, which is only one fifth of the original time, thus increasing a response speed of the electronic signature token and shortening the transmitting time of the signed data.

In summary, compared with a fact in related art that the signed data is transmitted after displaying information is confirmed by the user, in the embodiments of the present disclosure, by transmitting the signed data at two time points (i.e., before the displaying information is confirmed by the user and after the displaying information is confirmed by the user), the data size transmitted after the displaying information is confirmed by the user is significantly decreased, thus reducing the transmitting time of the data.

In addition, because before the displaying information is confirmed by the user, a transmission line between the electronic signature token and the external device is idle, in embodiments of the present disclosure, the idle state is used to transmit the part of the signed data so as to increase a utilization rate of the transmission line.

Figure 2:
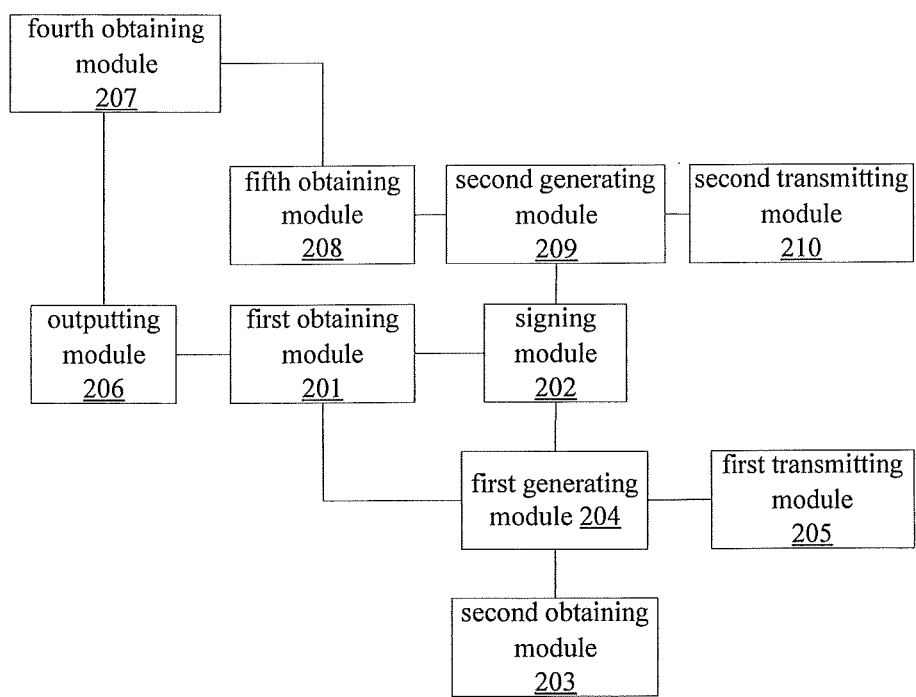
FIG. 2 is block diagram of an electronic signature token provided by embodiment 2 of the present disclosure.

FIG. 2 is block diagram of an electronic signature token provided by embodiment 2 of the present disclosure. The electronic signature token includes:

a first obtaining module 201, configured to obtain a signing request data packet comprising data to be signed;

a signing module 202, connected with the first obtaining module 201, and configured to sign the data to be signed to obtain signed data;

a second obtaining module 203, configured to obtain a preset first transmitting strategy;

a first generating module 204, connected with the signing module 202 and the second obtaining module 203, and configured to obtain first data to be transmitted according to a part of the signed data and the first transmitting strategy;

a first transmitting module 205, connected with the first generating module 2, and configured to transmit the first data to be transmitted by one time or to divide the first data to be transmitted into multiple segments of first data and to transmit the multiple segments of first data by multiple times;

an outputting module 206, connected with the first obtaining module 201, and configured to extract critical information of the data to be signed, and to output the critical information of the data to be signed, after obtaining the signing request data packet;

a fourth obtaining module 207, connected with the outputting module 206, and configured to obtain a confirmation instruction for the outputted critical information of the data to be signed;

a fifth obtaining module 208, configured to obtain a preset second transmitting strategy after obtaining the confirmation instruction;

a second generating module 209, connected with the fifth obtaining module 208, and configured to obtain second data to be transmitted according to a remaining part of the signed data and the second transmitting strategy;

a second transmitting module 210, connected with the second generating module 209, and configured to transmit the second data to be transmitted by one time or to divide the second data to be transmitted into multiple segments of second data and to transmit the multiple segments of second data by multiple times.

The first transmitting strategy is to encrypt the part of the signed data and then to transmit the part of signed data encrypted.

The first obtaining module 205 includes: an obtaining unit, configured to obtain an encrypting strategy corresponding to the part of the signed data; an encrypting unit, connected with the obtaining unit, and configured to encrypt at least the part of the signed data by using the encrypting strategy to obtain a first encrypted result, and to make the first encrypted result as the first data to be transmitted.

Alternatively, the electronic signature token further includes: a third transmitting module, configured to transmit the encrypting strategy after obtaining the confirmation instruction for the critical information of the data to be signed.

The encrypting strategy transmitted by the third transmitting module is transmitted when the second data to be transmitted is being transmitted by the second transmitting module.

A data size of the part of the signed data is greater than or equal to that of the remaining part of the signed data.

The data size of the remaining part of the signed data is 48 bytes.

In summary, compared with a fact in related art that the signed data is transmitted after displaying information is confirmed by a user, in the embodiments of the present disclosure, by transmitting the signed data at two time points (i.e., before the displaying information is confirmed by the user and after the displaying information is confirmed by the user), the data size transmitted after the displaying information is confirmed by the user is significantly decreased, thus reducing a transmitting time of the data.

In addition, because before the displaying information is confirmed by the user, a transmission line between the electronic signature token and an external apparatus is idle, in embodiments of the present disclosure, the idle state is used to transmit a part of the signed data so as to increase a utilization rate of the transmission line.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for transmitting signed data, comprising:
receiving, from an external device, a signing request data packet at an instruction execution system of an electronic signature token, the instruction execution system having at least one processor, wherein the signing request data packet comprises data to be signed;
signing the data to be signed with the instruction execution system of the electronic signature token to obtain signed data;
obtaining a preset first transmitting strategy, generating first data to be transmitted based on to a part of the signed data and according to the preset first transmitting strategy, and transmitting the first data to be transmitted to the external device according to the preset first transmitting strategy, the first data to be transmitted being transmitted all at once or divided into multiple segments of first data, each segment of first data being transmitted individually, with the instruction execution system of the electronic signature token;
after receiving the signing request data packet, extracting critical information of the data to be signed with the instruction execution system of the electronic signature token, and outputting the critical information of the data to be signed, with a display or sound device of the electronic signature token;
receiving a confirmation instruction for the outputted critical information of the data to be signed with an interface or a key of the electronic signature token; and
after receiving the confirmation instruction, obtaining a preset second transmitting strategy, generating second data to be transmitted based on a remaining part of the signed data and according to the preset second transmitting strategy, and transmitting the second data to be transmitted to the external device according to the preset second transmitting strategy, the second data to be transmitted being transmitted all at once or divided into multiple segments of second data, each segment of second data being transmitted individually, with the instruction execution system of the electronic signature token.

2. The method according to claim 1, wherein:
the preset first transmitting strategy indicates that the part of the signed data is to be encrypted before being transmitted;
the obtaining of the preset first transmitting strategy includes obtaining an encrypting strategy corresponding to the part of the signed data; and
the generating of the first data to be transmitted includes encrypting the part of the signed data with the instruction execution system of the electronic signature token according to the encrypting strategy to obtain the first data to be transmitted.

3. The method according to claim 2, after obtaining the confirmation instruction by the electronic signature token, further comprising:
transmitting the encrypting strategy with the instruction execution system of the electronic signature token.

4. The method according to claim 3, wherein the encrypting strategy is transmitted when the second data to be transmitted is being transmitted.

5. The method according to claim 4, wherein a data size of the part of the signed data is greater than or equal to that of the remaining part of the signed data.

6. The method according to claim 3, wherein a data size of the part of the signed data is greater than or equal to that of the remaining part of the signed data.

7. The method according to claim 2, wherein a data size of the part of the signed data is greater than or equal to that of the remaining part of the signed data.

8. The method according to claim 7, wherein the data size of the remaining part of the signed data is 48 bytes.

9. The method according to claim 1, wherein a data size of the part of the signed data is greater than or equal to that of the remaining part of the signed data.

10. The method according to claim 9, wherein the data size of the remaining part of the signed data is 48 bytes.

11. An electronic signature token, comprising:
a non-transitory computer-readable medium comprising computer-executable instructions stored thereon; and
an instruction execution system having at least one processor, the instruction execution system being configured by the instructions to:
receive, from an external device, a signing request data packet comprising data to be signed;
sign the data to be signed to obtain signed data;
obtain a preset first transmitting strategy;
generate first data to be transmitted based on to a part of the signed data and according to the preset first transmitting strategy;
transmit the first data to be transmitted to the external device according to the preset first transmitting strategy, the first data to be transmitted being transmitted all at once, or divided into multiple segments of first data, each segment of first data being transmitted individually;
after receiving the signing request data packet, extract critical information of the data to be signed, and output the critical information of the data to be signed with a display or sound device of the electronic signature token;
receive a confirmation instruction for the outputted critical information of the data to be signed with an interface of the electronic signature token;
after receiving the confirmation instruction, obtain a preset second transmitting strategy after obtaining the confirmation instruction;
generate second data to be transmitted based on a remaining part of the signed data and according to the preset second transmitting strategy; and
transmit the second data to be transmitted to the external device according to the preset second transmitting strategy, the second data to be transmitted being transmitted all at once or divided into multiple segments of second data, each segment of second data being transmitted individually.

12. The electronic signature token according to claim 11, wherein:
  the preset first transmitting strategy indicates that the part of the signed data is to be encrypted before being transmitted;
  the instruction execution system is further configured by the instructions to obtain an encrypting strategy corresponding to the part of the signed data when obtaining the preset first transmitting strategy; and
  the instruction execution system is further configured by the instructions to generate the first data to be transmitted by encrypting the part of the signed data according to the encrypting strategy.

13. The electronic signature token according to claim 12, wherein the instruction execution system is further configured by the instructions to:
  transmit the encrypting strategy after obtaining the confirmation instruction for the critical information of the data to be signed.

14. The electronic signature token according to claim 13, wherein the encrypting strategy is transmitted when the second data to be transmitted is being transmitted.

15. The electronic signature token according to claim 14, wherein a data size of the part of the signed data is greater than or equal to that of the remaining part of the signed data.

16. The electronic signature token according to claim 13, wherein a data size of the part of the signed data is greater than or equal to that of the remaining part of the signed data.

17. The electronic signature token according to claim 12, wherein a data size of the part of the signed data is greater than or equal to that of the remaining part of the signed data.

18. The electronic signature token according to claim 17, wherein the data size of the remaining part of the signed data is 48 bytes.

19. The electronic signature token according to claim 11, wherein a data size of the part of the signed data is greater than or equal to that of the remaining part of the signed data.

20. The electronic signature token according to claim 19, wherein the data size of the remaining part of the signed data is 48 bytes.

\* \* \* \* \*